(12) United States Patent
Yang et al.

(10) Patent No.: US 7,719,655 B2
(45) Date of Patent: May 18, 2010

(54) SPACERS FOR MAINTAINING CELL GAPS IN DISPLAY DEVICES

(75) Inventors: Yong-Ho Yang, Seoul (KR); Kyo-Seop Choo, Suwon-si (KR); Jin-Suk Park, Seoul (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 11/855,417

(22) Filed: Sep. 14, 2007

(65) Prior Publication Data
US 2008/0002075 A1 Jan. 3, 2008

Related U.S. Application Data

(62) Division of application No. 10/785,239, filed on Feb. 23, 2004, now Pat. No. 7,286,204.

(30) Foreign Application Priority Data

Mar. 28, 2003 (KR) .......................... 10-2003-19597
Apr. 1, 2003 (KR) .......................... 10-2003-20598

(51) Int. Cl.
*G02F 1/1339* (2006.01)
*G02F 1/1335* (2006.01)

(52) U.S. Cl. .......................... 349/155; 349/157; 349/12; 349/114

(58) Field of Classification Search .................. 349/155, 349/157, 12.114, 12, 114
See application file for complete search history.

(56) References Cited

U.S. PATENT DOCUMENTS

| | | | |
|---|---|---|---|
| 5,917,572 A | 6/1999 | Kurauchi et al. | |
| 6,323,932 B1 | 11/2001 | Zhang et al. | |
| 6,583,846 B1 | 6/2003 | Yanagawa et al. | |
| 6,690,441 B2 | 2/2004 | Moriya | |
| 6,690,445 B2* | 2/2004 | Matsumoto | 349/155 |
| 6,806,934 B2 | 10/2004 | Furuhashi et al. | |
| 6,839,099 B2 | 1/2005 | Fukunishi | |
| 6,870,592 B1* | 3/2005 | Yamamoto et al. | 349/155 |
| 7,295,277 B2* | 11/2007 | Mori et al. | 349/155 |
| 2003/0076471 A1* | 4/2003 | Yanagawa et al. | 349/155 |

(Continued)

FOREIGN PATENT DOCUMENTS

JP 10-096955 4/1998

(Continued)

*Primary Examiner*—Mike Qi
(74) *Attorney, Agent, or Firm*—Innovations Counsel LLP

(57) ABSTRACT

The invention includes a liquid crystal display panel including spacers and a method of making this panel. The spacers, which are positioned in the liquid crystal-filled gap between a first substrate and a second substrate, provide support to the substrates and prevent the substrate from bending when the device is used as a touch screen panel. By preventing the bending of the device, the spacers help prevent the undesirable ripple effect suffered by liquid crystal devices. In order to minimize the amount of light blocked by the spacers, the spacers are formed in a region where light is substantially intercepted anyway, such as in a contact hole. A black matrix layer is formed on the spacers. The spacers may be distributed unevenly between the substrates, depending on how much force each of the spacers will have to absorb in each area of the panel.

11 Claims, 17 Drawing Sheets

U.S. PATENT DOCUMENTS

2003/0214621 A1* 11/2003 Kim et al. .................. 349/155
2005/0099577 A1   5/2005 Lee et al.
2006/0103803 A1   5/2006 Jeon et al.

FOREIGN PATENT DOCUMENTS

| | | | |
|---|---|---|---|
| JP | 10096955 A * | 4/1998 | |
| JP | 11-212048 | 8/1999 | |
| JP | 2000-122071 * | 4/2000 | |
| JP | 2000122071 A * | 4/2000 | |
| JP | 2001-033779 A | 2/2001 | |

* cited by examiner

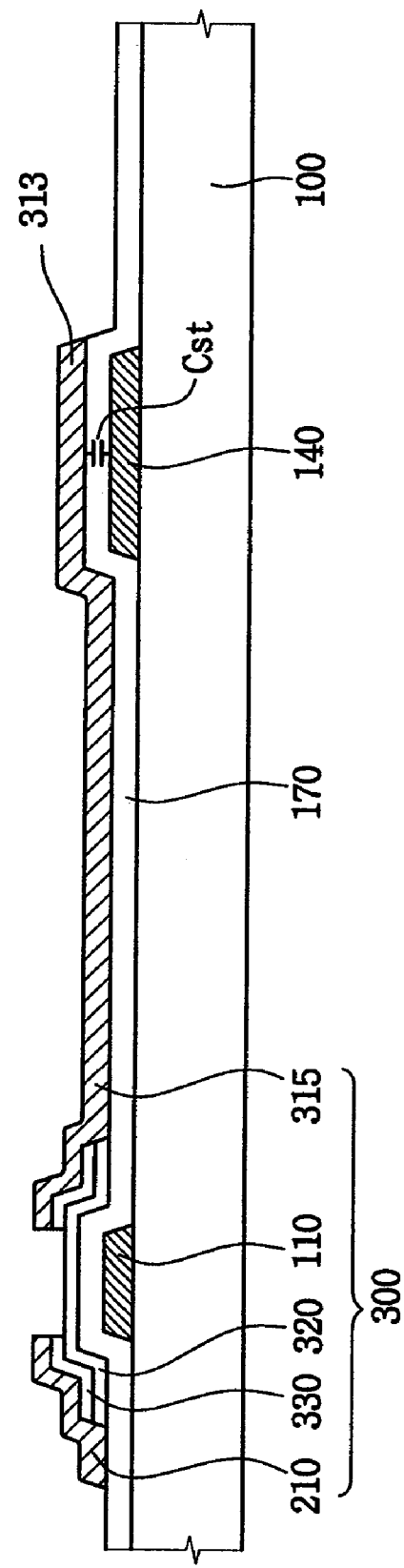

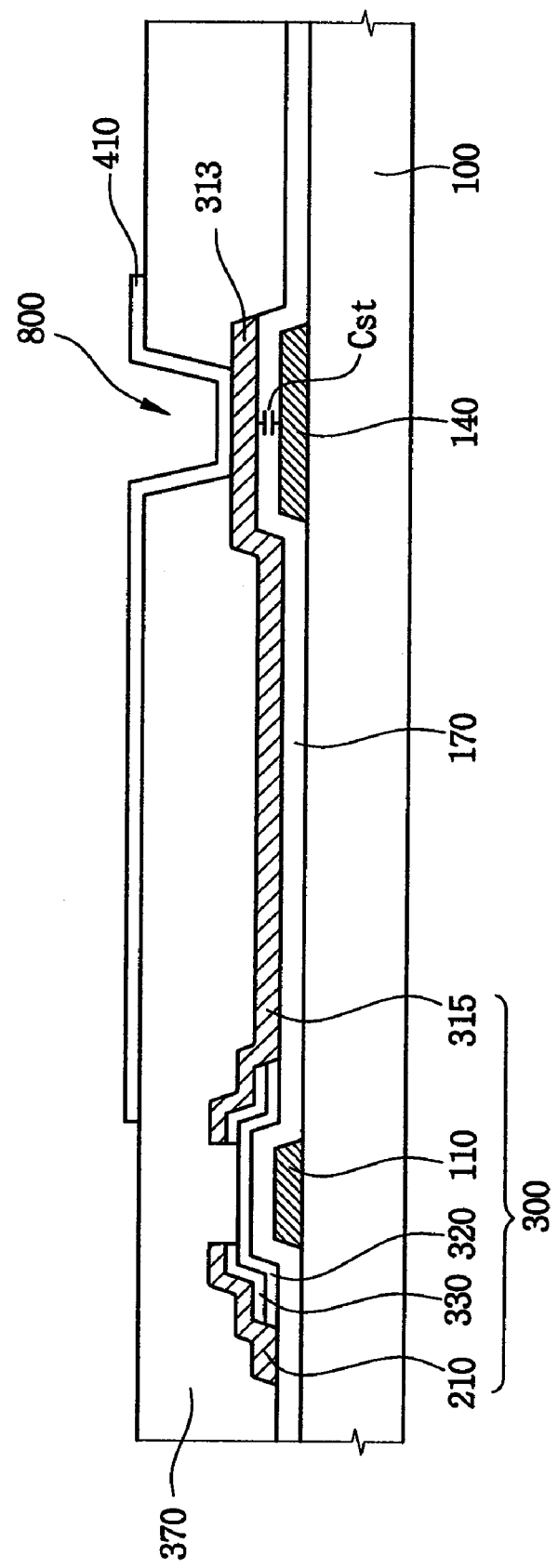

SPACERS FOR MAINTAINING CELL GAPS IN DISPLAY DEVICES

CROSS REFERENCE TO RELATED APPLICATIONS

This application is a divisional application of U.S. patent application Ser. No. 10/785,239 filed Feb. 23, 2004, which claims the benefit of priority from relies for priorities Korean Patent Application No. 10-2003-19597 filed Mar. 28, 2003 and Korean Patent Application No. 10-2003-20598 filed Apr. 1, 2003, the contents of which are herein incorporated by reference in their entirety.

BACKGROUND OF THE INVENTION

1. Field of the Invention

The present invention relates to an LCD (Liquid Crystal Display) apparatus and a method of manufacturing the same, and more particularly to an LCD apparatus having an improved display quality and a method of manufacturing the same.

2. Description of the Related Art

Today, touch screen technologies are widely applied to electronic instruments such as a PDA (Personal Digital Assistants) or a mobile communication device.

In a touch screen LCD apparatus, a ripple phenomenon sometimes appears on the LCD panel when a user touches a surface of the LCD panel. This ripple phenomenon, which is highly undesirable, is caused by swelling of the liquid crystal when the user repeatedly touches a certain area on the surface of the LCD panel.

In an attempt to prevent the ripple phenomenon, a column spacer has been formed inside the LCD panel to support the surface that is touched during use. However, since the column spacer is uniformly distributed inside the LCD panel, use of these spacers is often accompanied by loss of efficiency/quality in other aspects, such as image quality. This is because the occurrence and the extent of the LCD panel deformation varies depending on the location of the panel that is touched by the user even if the user touches the different locations at the same force.

BRIEF SUMMARY OF THE INVENTION

The present invention provides an LCD apparatus having an improved display quality, and a method suitable for manufacturing the above LCD apparatus.

The invention includes a light emitting apparatus that includes 1) a first substrate having a first region that substantially transmits light and a second region that substantially intercepts light, 2) a second substrate attached to the first substrate so as to form a cell gap of a predetermined distance between the first and the second substrates, 3) a liquid crystal layer positioned in the cell gap, and 4) a spacer positioned between the first substrate and the second substrate in the second region so as to maintain the cell gap substantially without blocking light that is not intercepted by the second region. By forming the spacer near a the second region that substantially intercepts light, the spacer does not cause further loss of light or decrease of opening ratio. At the same time, by positioning the spacers between the first and the second substrates, thereby providing extra support to the light emitting apparatus when it is used as a touch screen device, the spacers will reduce the undesirable ripple effect.

The invention also includes the method of making the above light emitting apparatus. The method includes 1) obtaining a first substrate having a first region that substantially transmits light and a second region that substantially intercepts light, 2) attaching a second substrate to the first substrate so as to form a cell gap of a predetermined distance between the first and the second substrates, 3) filing the cell gap with liquid crystal, and 4) forming a spacer between the first and the second substrates to maintain the cell gap substantially without blocking light that is not intercepted by the second region, wherein the spacer is located in the second region. Since the spacer is located in the second region, it provides support to the display panel without blocking significant amount of light.

BRIEF DESCRIPTION OF THE DRAWINGS

The above and other advantages of the present invention will become readily apparent by reference to the following detailed description when considered in conjunction with the accompanying drawings wherein:

FIGS. 12A to 12F are views illustrating a method of manufacturing an LCD apparatus according to an exemplary embodiment of the present invention.

DETAILED DESCRIPTION OF THE INVENTION

As used herein, a "first member" refers to a first substrate and any peripheral layers deposited on the first substrate, and a "second member" refers to a second substrate and any peripheral layers deposited thereon. Specifically, a "second member 1000" includes a second substrate 100. A "spacer," as used herein, is any structure or mechanism used to form or maintain a cell gap between the first and the second members, and is not limited to a particular material, shape, or size.

Figure 1:
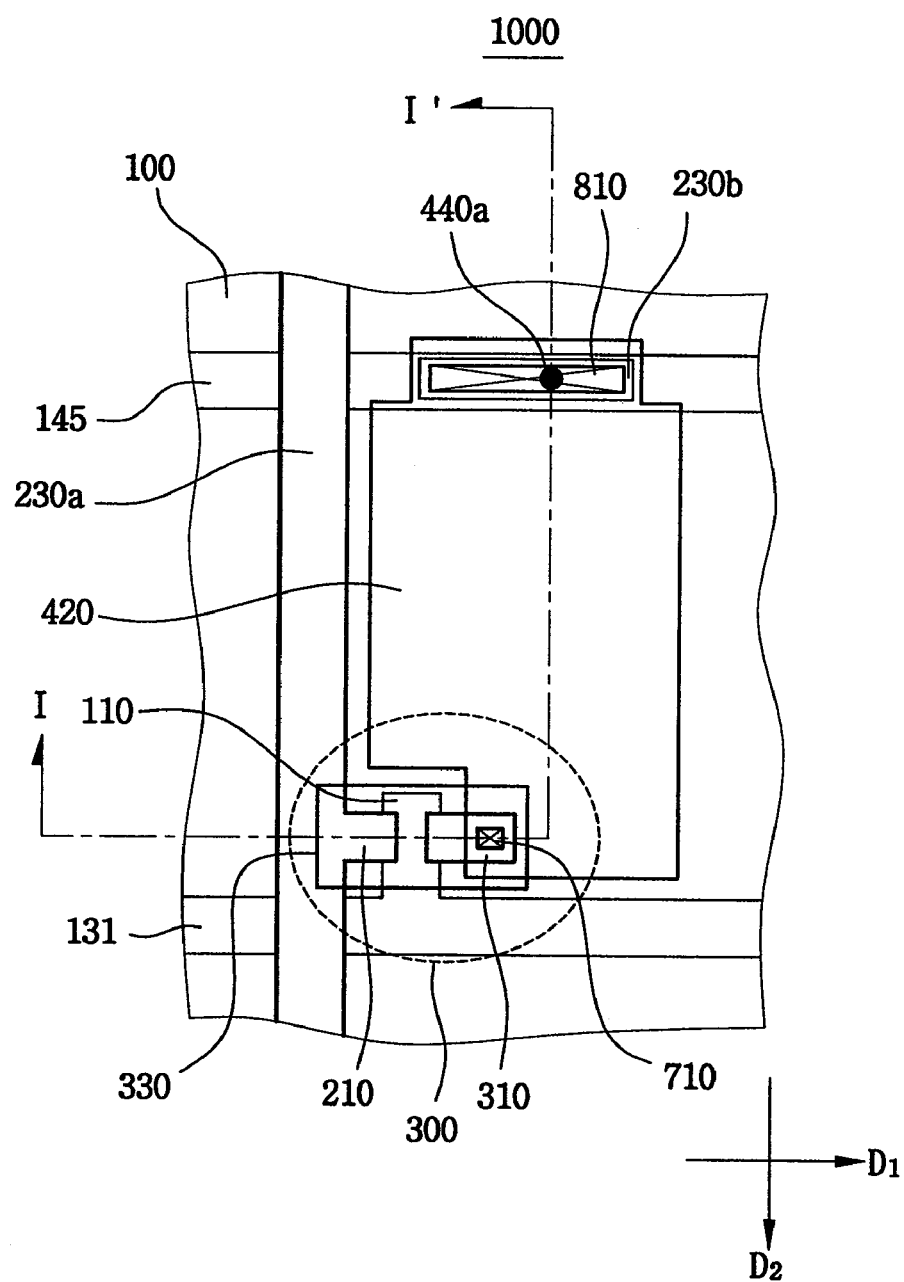
FIG. 1 is a plan view showing a lower substrate of an LCD apparatus according to an exemplary embodiment of the present invention.
Figure 2:
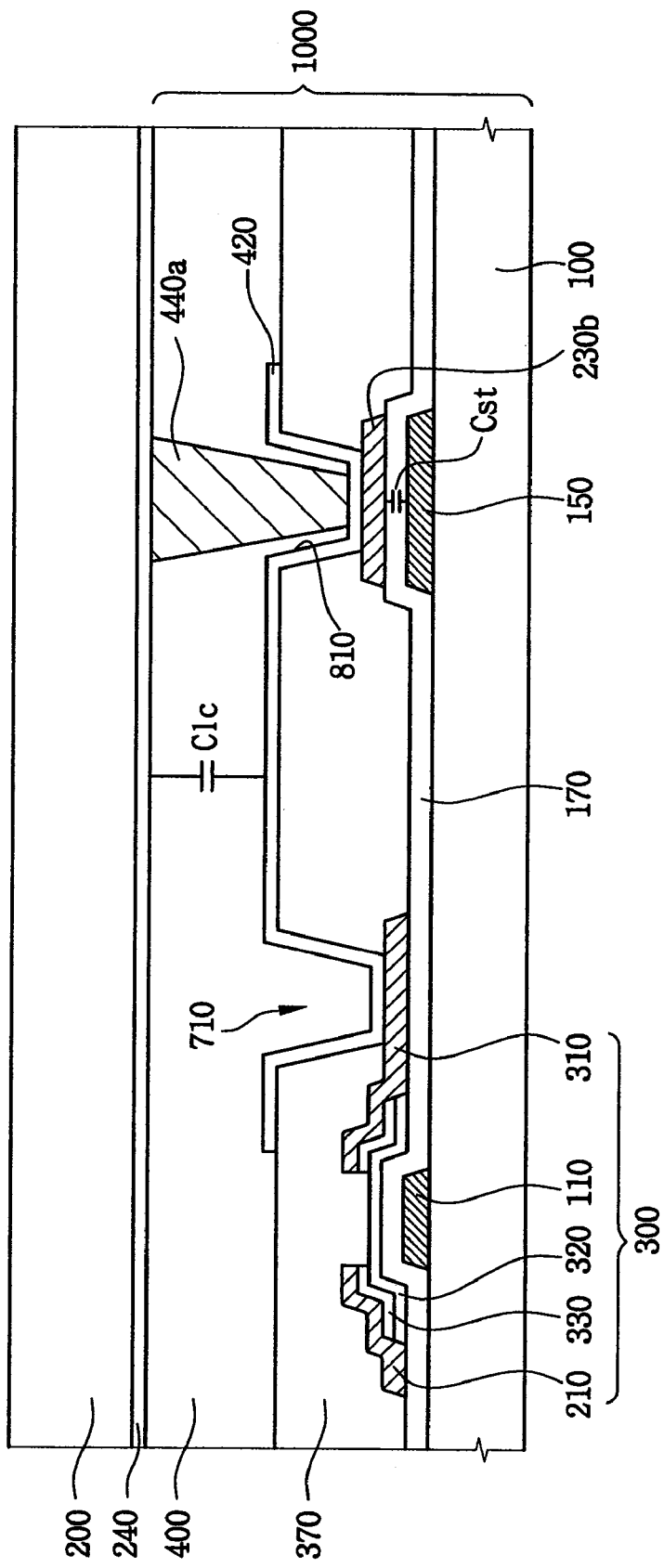
FIG. 2 is a cross-sectional view showing a transmissive type LCD apparatus having the lower substrate shown in FIG. 1.

FIG. 1 is a plan view showing a member (second member) of an LCD apparatus according to an exemplary embodiment of the present invention. FIG. 2 is a cross-sectional view showing a transmissive type LCD apparatus having the second member of FIG. 1

Referring to FIGS. 1 and 2, a transmissive type LCD apparatus 2000 includes a second member 1000, a first member 200 and a liquid crystal layer 400 interposed between the first and second members 1000 and 200.

The second member 1000 includes a plurality of pixels arranged in a matrix configuration. In this exemplary embodiment, a pixel positioned at a position of M column by N row, where N is a natural number greater than 2 and N is a natural number greater than 1, will be described. The pixel includes a (M−1)-th gate line 145, Mth gate line 131, Nth data line 230a, a TFT 300 and a pixel electrode 420.

A gate pattern is formed on a second substrate 100. The gate pattern includes the (M−1)-th gate line 145 extending in a first direction D1, the Mth gate line 131 extending in the first direction D1 and a gate electrode 110 branching from the Mth gate line 131. In this exemplary embodiment, the (M−1)-th gate line 145 is operated as a first auxiliary electrode 150 of an auxiliary capacitor Cst described below.

The gate pattern includes a conductive material such as aluminum (Al), aluminum alloy, molybdenum (Mo), molybdenum-tungsten alloy (MoW), chromium (Cr), or tantalum (Ta). The gate pattern may consist of a single layer, a double layer or a triple layer. In an exemplary case where the gate pattern is provided with double or triple layers, one layer includes the chromium (Cr) or the aluminum (Al) and another layer includes the aluminum (Al) or the molybdenum (Mo).

A gate insulating layer 170 is formed over the second substrate 100 comprising a silicon nitride ($SiN_x$) on which the gate pattern is formed. A semiconductor layer 320 and an ohmic contact layer 330 are formed on the gate insulating layer 170 near the gate electrode 110.

A data pattern is formed on the gate insulating layer 170 on which the ohmic contact layer 330 is formed. The data pattern includes the Nth data line 230a extending in a second direction D2 substantially perpendicular to the first direction D1, a source electrode 210 branching from the Nth data line 230a and a drain electrode 310 spaced apart from the source electrode 210 in a predetermined distance. The data pattern further includes a second auxiliary electrode 230b formed on the second substrate 100 and the gate insulating layer 170 and overlying the first auxiliary electrode 150.

Accordingly, the TFT 300 having the gate electrode 110, gate insulating layer 170, semiconductor layer 132, ohmic contact layer 133, source electrode 210 and drain electrode 310 is formed on the second substrate 100. Also, the auxiliary capacitor Cst having the first and second auxiliary electrodes 150 and 230b is formed on the second substrate 100.

An organic layer 370 including a poly-benzocyclobutene and an acrylic resin is formed over the second substrate 100 on which the data pattern is formed. The organic layer 370 is patterned through a photolithography process, so that first and second contact holes 710 and 810 are formed at the organic layer 370, exposing the drain electrode 310 and the second auxiliary electrode 230b, respectively. The pixel electrode 420 is electrically connected to the drain electrode 310 through the first contact hole 710 and electrically connected to the second auxiliary electrode 230b through the second contact hole 810.

The pixel electrode 420 includes a transparent conductive material, such as indium tin oxide (hereinafter, referred to as ITO), so as to transmit light provided from a direction of the second member 1000. The pixel electrode 420 is overlaps a part of the (M−1)-th gate line 145 but does not overlap the Nth data line 230a and the Mth gate line 131, as illustrated in FIG. 1.

The first member 200 includes a common electrode 240 positioned on the surface that is closest to the liquid crystal layer 400. The common electrode 240 includes ITO. The common electrode 240 operates as a liquid crystal capacitor Clc with the liquid crystal layer 400 and pixel electrode 420. The auxiliary capacitor Cst is electrically connected to the liquid crystal capacitor Clc by connecting the second auxiliary electrode 230b to the pixel electrode 420.

Due to a parasitic capacitance that appears between the gate and source electrodes 110 and 210 of the TFT 300, in general, a voltage signal applied to the pixel electrode 420 may be distorted. The distorted voltage signal is herein referred to as "kickback voltage." The kickback voltage sometimes causes a flicker in the transmissive type LCD apparatus 2000.

In this exemplary embodiment, since the transmissive type LCD apparatus 2000 includes the auxiliary capacitor Cst electrically connected to the liquid crystal capacitor Clc, the transmissive type LCD apparatus 2000 may reduce the kickback voltage and increase a voltage holding ratio of the liquid crystal capacitor Clc, thereby improving a display quality thereof.

In order to uniformly maintain a cell gap between the first and the second members 200 and 1000, the transmissive type LCD apparatus 2000 includes a column spacer 440a disposed between the first and second members 200 and 1000. The column spacer 440a is formed by depositing an organic layer on the common electrode 240 of the first member 200 and patterning the organic layer.

The column spacer 440a is formed on a non-effective display area. As used herein, an area on which the auxiliary capacitor Cst is formed is referred to as the "non-effective display area." The reason this area is referred to as the "non-effective display area" is that light from a light source (not shown), such as a backlight assembly disposed under the second member 1000, is intercepted by the first and second auxiliary electrodes 150 and 230b. The second auxiliary electrode 230b and a lower portion of the column spacer 440a is received in the second contact hole 810, so that the column spacer 440a makes contact with the pixel electrode 420 disposed on the second auxiliary electrode 230b.

By forming the column spacer 440a on the non-effective display area, any reduction in the opening ratio of the transmissive type LCD apparatus 2000 due the presence of the column spacer 440a can be avoided. Also, the column spacer 440a prevents the first member 200 from being pushed down toward the second member 1000, for example while being used as a touch screen panel.

Figure 3:
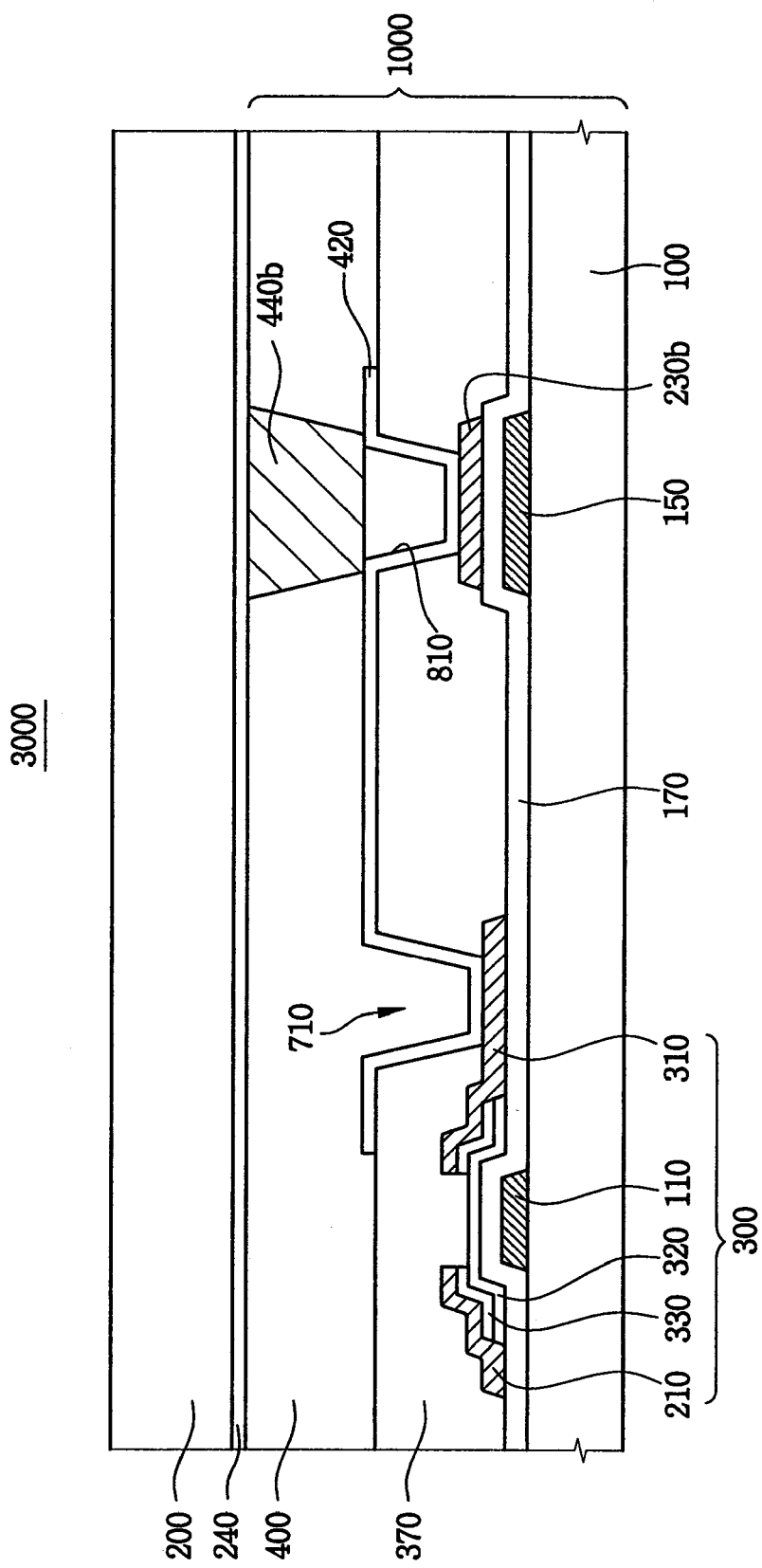
FIG. 3 is a cross-sectional view showing a transmissive type LCD apparatus according to another exemplary embodiment of the present invention.

FIG. 3 is a cross-sectional view showing a transmissive type LCD apparatus according to another exemplary embodiment of the present invention. In FIG. 3, the same reference numerals denote the same elements in FIG. 2, and thus the detailed descriptions of the same elements will be omitted.

Referring to FIGS. 1 and 3, a transmissive type LCD apparatus 3000 includes a column spacer 440a disposed between a first member 200 and a second member 1000 so as to uniformly-maintain a constant cell gap between the members. The column spacer 440a is formed by depositing an organic layer (not shown) on a common electrode 240 of the first member 200 and patterning the organic layer.

The column spacer 440a is formed in the non-effective display area on which an auxiliary capacitor Cst makes contact with a pixel electrode 420 disposed on an organic layer 370.

As described above, any reduction in the opening ratio of the transmissive type LCD apparatus 2000 due the presence of the column spacer 440a can be avoided by forming the column spacer 440a in the non-effective display area. Also, the column spacer 440a prevents the first member 200 from being pushed down toward the second member 1000, for example while being used as a touch screen panel.

Figure 4:
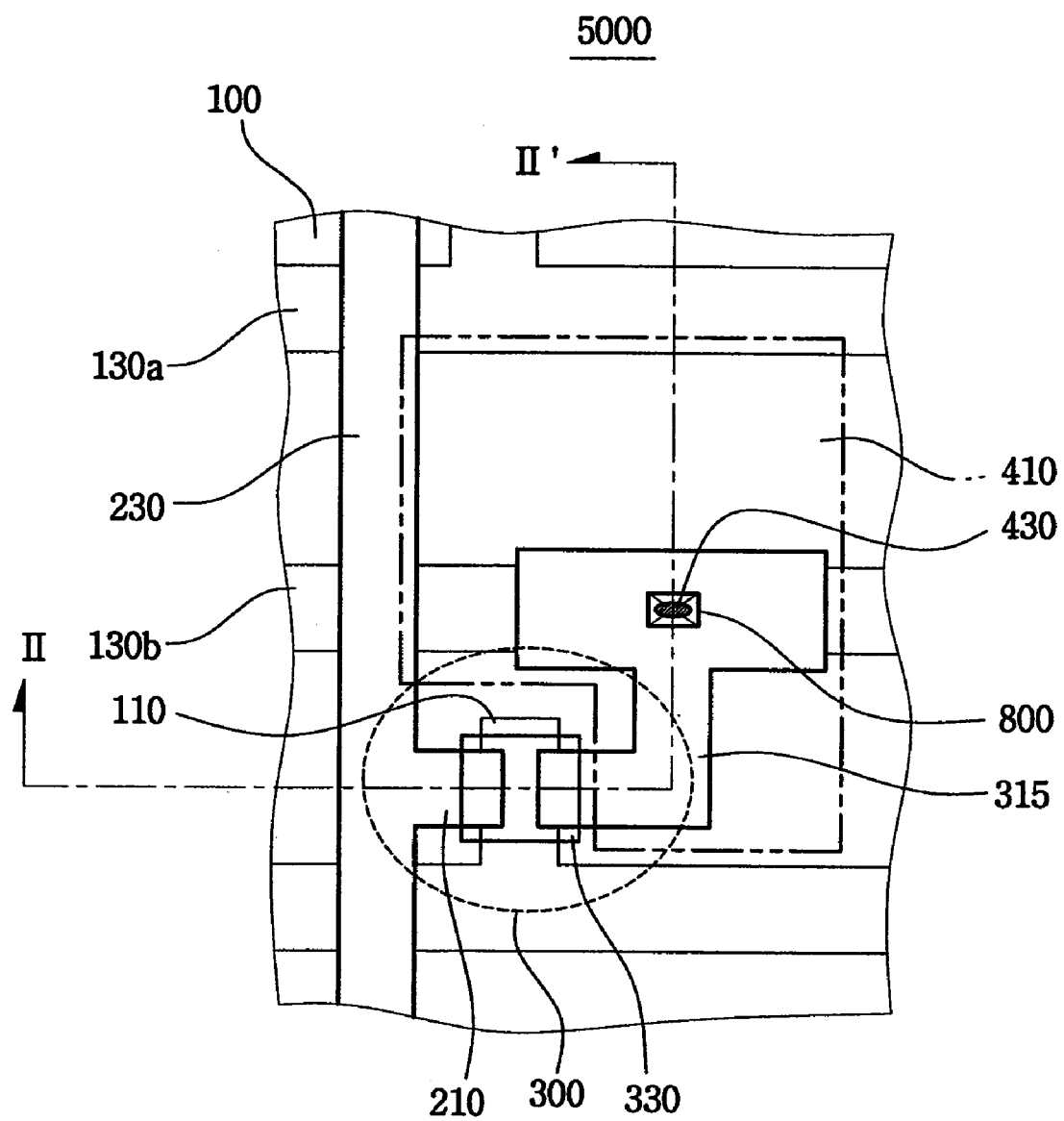
FIG. 4 is a plan view showing a lower substrate of an LCD apparatus according to another exemplary embodiment of the present invention.
Figure 5:
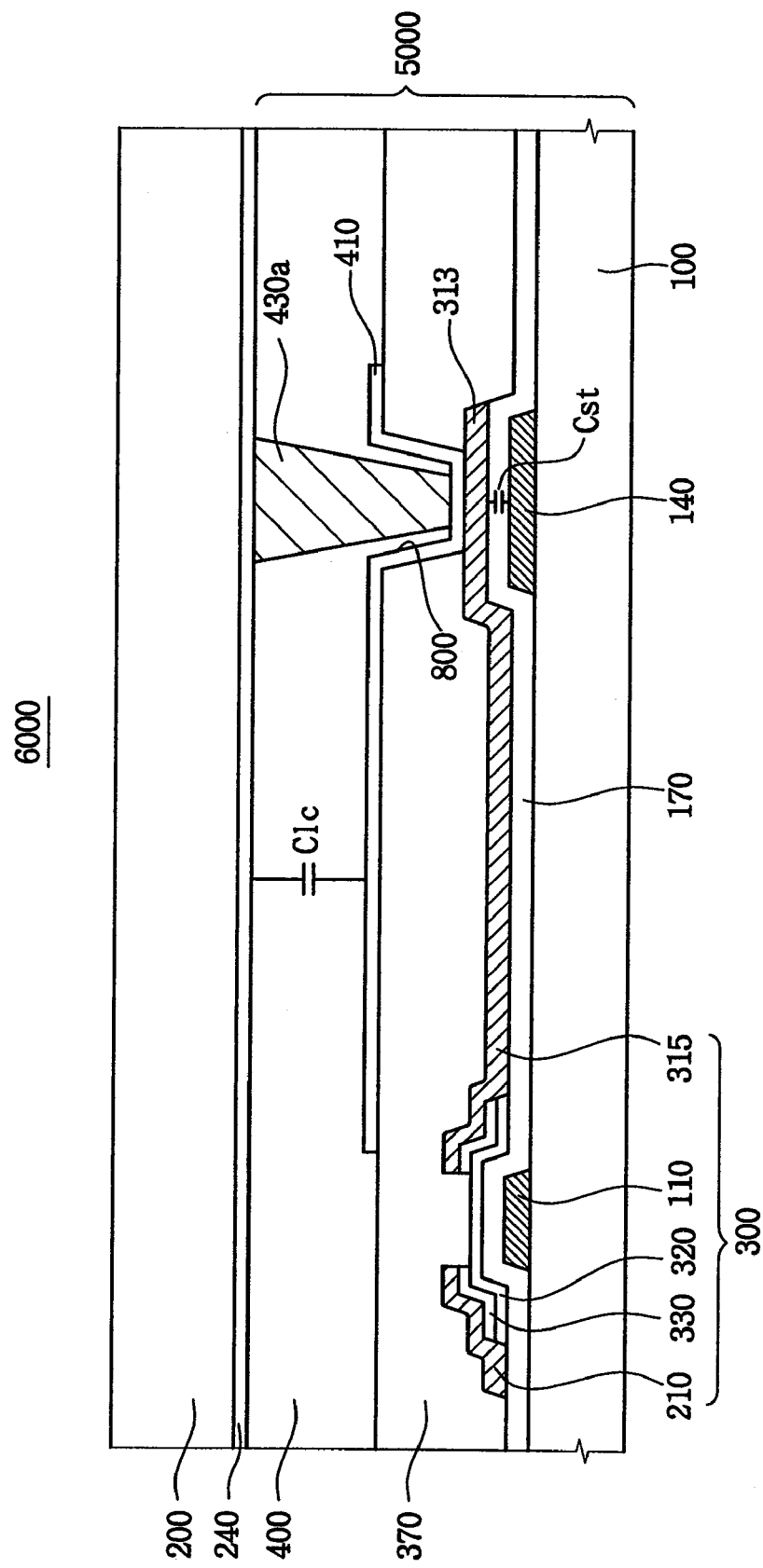
FIG. 5 is a cross-sectional view showing a transmissive type LCD apparatus having the lower substrate shown in FIG. 4.

FIG. 4 is a plan view showing a second substrate of an LCD apparatus according to another exemplary embodiment of the present invention. FIG. 5 is a cross-sectional view showing a transmissive type LCD apparatus having the second member shown in FIG. 4.

Referring to FIGS. 4 and 5, a transmissive type LCD apparatus 6000 includes an alternative second member 5000, a first member 200 and a liquid crystal layer 400 interposed between first and second members 200 and 5000.

The alternative second member 5000 includes a plurality of pixels arranged in a matrix configuration. Each of the pixels includes a gate line 130a, a data line 230, an auxiliary electrode line 130b, a TFT 300 and a pixel electrode 420.

A gate pattern is formed on an second substrate 100. The gate pattern includes the gate line 130a, the auxiliary electrode line 130b, and a gate electrode 110 of the TFT 330 branching from the gate line 130a. In this exemplary embodiment, the auxiliary electrode line 130b is operated as a first auxiliary electrode 140 of an auxiliary capacitor Cst described below. The auxiliary electrode line 130b is extended in a same direction as that of the gate line 130a.

A gate insulating layer 170 is formed over the second substrate 100 on which the gate pattern is formed. A semiconductor layer 320 and an ohmic contact layer 330 are successively formed on the gate insulating layer 170 corresponding to the gate electrode 110.

A data pattern is formed on the gate insulating layer 170 on which the semiconductor layer 320 and ohmic contact layer 330 are formed. The data pattern includes the data line 230a, a source electrode 210 branched from the data line 230a, and a drain electrode 310 spaced apart from the source electrode 210 in a predetermined distance. The drain electrode 315 is formed on the gate insulating layer 170, and extends so as to overlap the auxiliary electrode line 130b and operate as a second auxiliary electrode 313 of the auxiliary capacitor Cst.

Thus, the auxiliary capacitor Cst having the first auxiliary electrode 140 of the auxiliary electrode line 130b and the second auxiliary electrode 313 extending from the drain electrode 315 is completely formed on the second substrate 100.

The alternative second member 5000 includes an organic layer 370 through which a contact hole 800 is formed so as to expose the second auxiliary electrode 313. A pixel electrode 410 is formed on the second auxiliary electrode 313 exposed through the contact hole 800 and the organic layer 370. The pixel electrode 410 is electrically connected to the second auxiliary electrode 313 through the contact hole 800 and also electrically connected to the drain electrode 315 since the second auxiliary electrode 313 is an extension of the drain electrode 315.

The first member 200 includes a common electrode 240 positioned on the surface that is closest to the liquid crystal layer 400. The common electrode 240 operates as a liquid crystal capacitor Clc with the liquid crystal layer 400 and pixel electrode 420. The auxiliary capacitor Cst is electrically connected to the liquid crystal capacitor Clc by connecting the second auxiliary electrode 313 to the pixel electrode 420.

In this exemplary embodiment, since the transmissive type LCD apparatus 6000 includes the auxiliary capacitor Cst electrically connected to the liquid crystal capacitor Clc, the transmissive type LCD apparatus 6000 reduces the kickback voltage and increases a voltage holding ratio of the liquid crystal capacitor Clc, thereby improving the display quality.

In order to uniformly maintain a cell gap between the first and second members 200 and 5000, the transmissive type LCD apparatus 6000 includes a column spacer 430a disposed between the first and second members 200 and 5000. The column spacer 430a is formed on a non-effective display area on which the second auxiliary electrode 313 is received in the contact hole 800, so that the column spacer 430a makes contact with the pixel electrode 420 disposed on the second auxiliary electrode 313.

That is, the light provided from a light source (not shown), such as a backlight assembly disposed under the alternative second member 5000, is intercepted by the first and second auxiliary electrodes 140 and 313. Thus, an area on which the auxiliary capacitor Cst is formed is a noneffective display area.

As described above, any reduction in the opening ratio of the transmissive type LCD apparatus 6000 due to the presence of the column spacer 430a can be avoided by forming the column spacer 430a in the non-effective display area. Also, the column spacer 430a prevents the first member 200 from being pushed down toward the alternative second member 5000.

Figure 6:
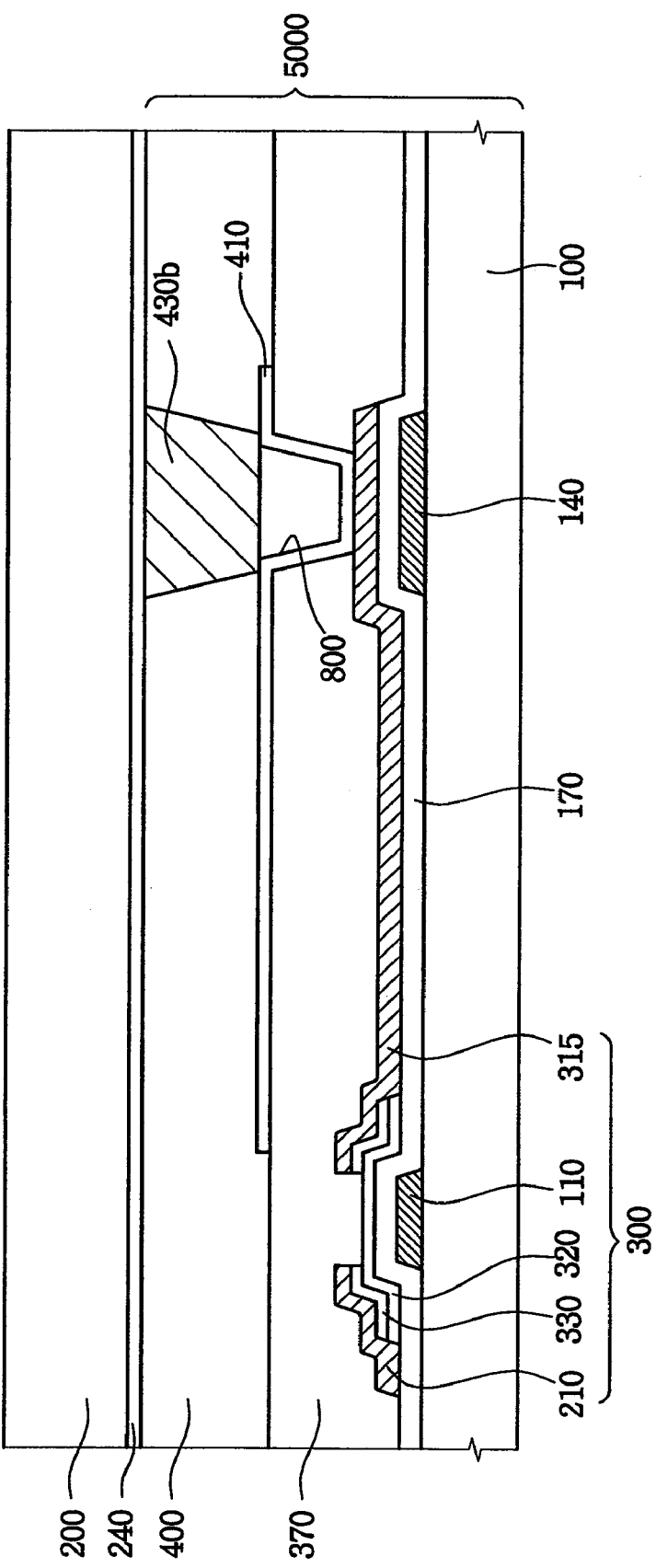
FIG. 6 is a cross-sectional view showing a transmissive type LCD apparatus according to another exemplary embodiment of the present invention.

FIG. 6 is a cross-sectional view showing a transmissive type LCD apparatus according to another exemplary embodiment of the present invention. In FIG. 6, the same reference numerals denote the same elements in FIG. 5, and thus the detailed descriptions of the same elements will be omitted.

Referring to FIG. 6, a transmissive type LCD apparatus 7000 includes a first member 200, a alternative second member 5000, a liquid crystal layer 400 interposed between the first and second members 200 and 5000 and a column spacer 430b disposed between the first and second members 200 and 5000 so as to uniformly maintain a cell gap therebetween.

The alternative second member 5000 includes a gate electrode 110, a first auxiliary electrode 140, a gate insulating layer 170, a semiconductor layer 320, an ohmic contact layer 330, a source electrode 210, a drain electrode 310 operated as a second auxiliary electrode 313, an organic layer 370 through which a contact hole 800 is formed so as to expose the second auxiliary electrode 313, and a pixel electrode 410 formed on the second auxiliary electrode 313 exposed through the contact hole 800 and the organic layer 370.

The pixel electrode 410 is electrically connected to the second auxiliary electrode 313 through the contact hole 800 and also electrically connected to the drain electrode 315 since the second auxiliary electrode 313 extends from the drain electrode 315.

The column spacer 430b is formed by depositing an organic layer (not shown) on a common electrode 240 formed on the first member 200 and patterning the organic layer.

The column spacer 430b is formed in a non-effective display area where an auxiliary capacitor Cst makes contact with the pixel electrode 410 disposed on the organic layer 370. Particularly, the column spacer 430b makes contact with the pixel electrode 410 at an upper portion of the contact hole 800 formed on the organic layer 370. The space in the contact hole 800 that is dosed by the column spacer 430b usually contains liquid crystals or air.

As described above, any reduction in the opening ratio of the transmissive type LCD apparatus 7000 due to the presence of the column spacer 430b is avoided by forming the column spacer 430b in the non-effective display area. Also, the column spacer 430b prevents the first member 200 from being pushed down toward the alternative second member 5000, for example when the transmissive type LCD apparatus 7000 is used as a touch screen device.

Figure 7:
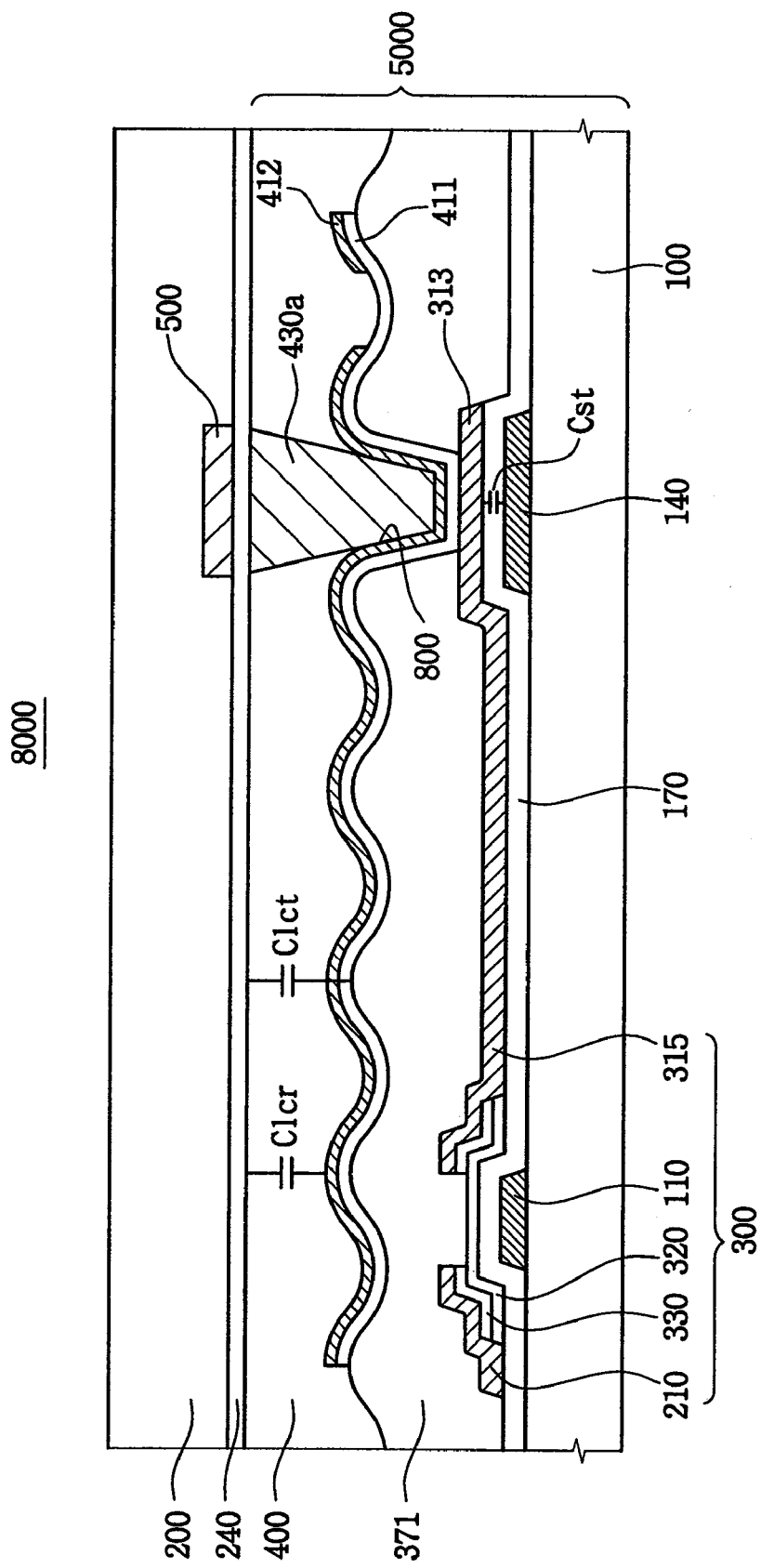
FIG. 7 is a cross-sectional view showing a transflective type LCD apparatus according to another exemplary embodiment of the present invention.

FIG. 7 is a cross-sectional view showing a transflective type LCD apparatus according to another exemplary embodiment of the present invention.

Referring to FIG. 7, a transflective type LCD apparatus 8000 includes a alternative second member 5000, a first member 200 and a liquid crystal layer 400 interposed between the lower and upper substrates 5000 and 200.

The alternative second member 5000 includes a plurality of pixels arranged on an second substrate 100 in a matrix configuration. Each of the pixels includes a TFT 300, a transmissive electrode 411, a reflective electrode 412, a first auxiliary electrode 140, a second auxiliary electrode 313 and an organic layer 371.

The TFT 300 having a gate electrode 110, a source electrode 210 and a drain electrode 315 is formed on the second substrate 100. Also, an auxiliary capacitor Cst having the first auxiliary electrode 140, a gate insulating layer 170 and the second auxiliary electrode 313 is formed while the TFT 300 is formed.

The organic layer 371 is formed over the second substrate 100 on which the TFT 300 and auxiliary capacitor Cst are formed. The organic layer 371 has a contact hole 800 so as to expose the second auxiliary electrode 313. Also, the organic layer 371 has an upper surface formed with concave and convex portions, thereby improving a reflectance of the reflective electrode 412 formed on the organic layer 371.

The transmissive and reflective electrodes 411 and 412 are successively formed on the organic layer 371. The transmissive and reflective electrodes 411 and 412 are electrically connected to the second auxiliary electrode 313 through the contact hole 800. Also, the transmissive and reflective electrodes 411 and 412 may be electrically connected to the drain electrode 315 because the second auxiliary electrode 313 is an extension of the drain electrode 315.

The first member 200 includes a black matrix layer 500 and a common electrode 240. In the LCD device 10000, the common electrode 240 is positioned on the surface of the first member 200 that is closest to the liquid crystal layer 400. The liquid layer 400 is interposed between the common electrode 240 and the reflective or transmissive electrodes 412 and 411. A first liquid crystal capacitor Clct is provided between the common electrode 240 and the transmissive electrode 411 and a second liquid crystal capacitor Clcr is provided between the common electrode 240 and the reflective electrode 412.

A column spacer 430a is disposed between the first and second members 200 and 5000. A lower portion of the column spacer 430a is received in the contact hole 800, so that the column spacer 430a makes contact with the reflective electrode 412 disposed on the second auxiliary electrode 313.

As described above, any reduction in the opening ratio of the transmissive type LCD apparatus 8000 due to the formation of the column spacer 430a is avoided by forming the column spacer 430a in the non-effective display area where the auxiliary capacitor Cst is formed. Also, the column spacer 430a prevents the first member 200 from being pushed down toward the alternative second member 5000 when the transmissive type LCD apparatus 8000 is used as a touch screen device.

In addition, the black matrix 500 formed on first member 200 is disposed on the non-effective display area corresponding to the column spacer 430a. The black matrix prevents the column spacer 430a from being projected onto a screen of the transflective type LCD apparatus 8000, thereby improving the display quality of the transflective type LCD apparatus 8000.

Figure 8:
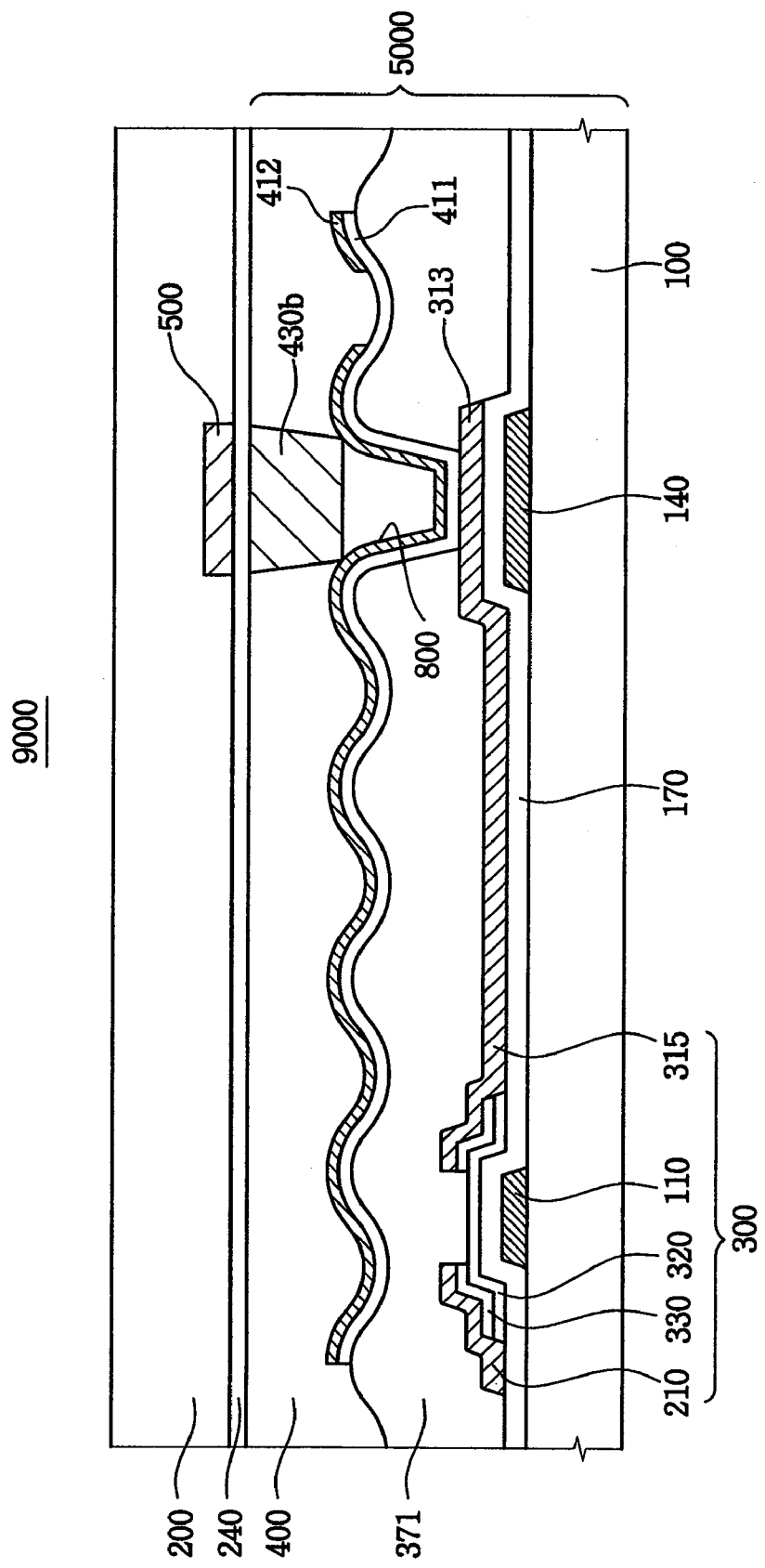
FIG. 8 is a cross-sectional view showing a transflective type LCD apparatus according to another exemplary embodiment of the present invention.

FIG. 8 is a cross-sectional view showing a transflective type LCD apparatus according to another exemplary embodiment of the present invention. In FIG. 8, the same reference numerals denote the same elements in FIG. 7, and thus the detailed descriptions of the same elements will be omitted.

Referring to FIG. 8, a transflective type LCD apparatus 9000 includes a first member 200, a alternative second member 5000, a liquid crystal layer 400 interposed between the first and second members 200 and 5000, and a column spacer 430b disposed between the first and second members 200 and 5000 so as to uniformly maintain a cell gap between the substrates.

The alternative second member 5000 includes a gate electrode 110, a first auxiliary electrode 140, a gate insulating layer 170, a semiconductor layer 320, an ohmic contact layer 330, a source electrode 210, a drain electrode 310 operating as a second auxiliary electrode 313, an organic layer 370 through which a contact hole 800 is formed so as to expose the second auxiliary electrode 313, and a pixel electrode 410 formed on the second auxiliary electrode 313 exposed through the contact hole 800 and the organic layer 371. The pixel electrode 410 includes a transmissive electrode 411 and a reflective electrode 412 formed on the transmissive electrode 411.

The pixel electrode 410 is electrically connected to the second auxiliary electrode 313 through the contact hole 800 and also electrically connected to the drain electrode 315 because the second auxiliary electrode 313 is an extension of the drain electrode 315.

The column spacer 430b is formed by depositing an organic layer (not shown) on a common electrode 240 formed on the first member 200 and patterning the organic layer.

The column spacer 430b is formed on a non-effective display area where an auxiliary capacitor Cst contacts the pixel electrode 410 disposed on the organic layer 370. Particularly, the column spacer 430b makes contact with the reflective electrode 412 at an upper portion of the contact hole 800 formed on the organic layer 371.

As described above, any reduction in the opening ratio of the transflective type LCD apparatus 9000 due to the presence of the column spacer 430b is avoided by forming the column spacer 430b in the non-effective area.

The first member 200 includes a black matrix layer 500 disposed on the non-effective display area near the column spacer 430b. Due to the presence of the black matrix layer 500, the column spacer 430b is not projected onto a screen of the transflective type LCD apparatus 9000, thereby improving the display quality of the transflective type LCD apparatus 9000.

Also, the transflective type LCD apparatus 9000 may prevent the first member 200 from being pushed down toward the alternative second member 5000 because the column spacer 430b is formed on the pixel electrode 410.

Figure 9:
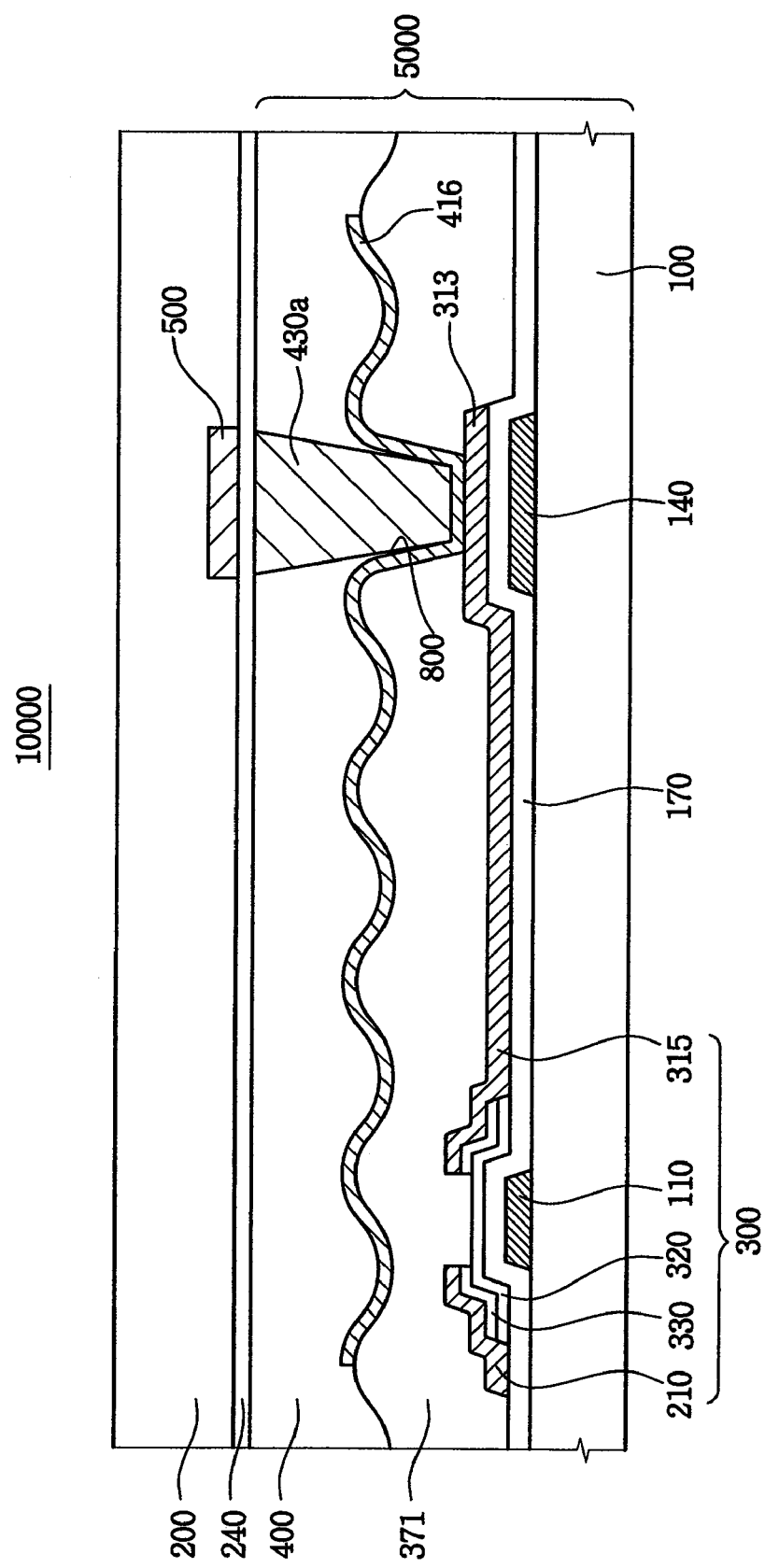
FIG. 9 is a cross-sectional view showing a reflective LCD apparatus according to another exemplary embodiment of the present invention.

FIG. 9 is a cross-sectional view showing a reflective LCD apparatus according to another exemplary embodiment of the present invention.

Referring to FIG. 9, a reflective type LCD apparatus 10000 includes a alternative second member 5000, a first member 200 and a liquid crystal layer 400 interposed between the lower and upper substrates 5000 and 200.

The alternative second member 5000 includes a plurality of pixels arranged on an second substrate 100 in a matrix configuration. Each of the pixels includes a TFT 300, a reflective electrode 416, a first auxiliary electrode 140, a second auxiliary electrode 313 and an organic layer 371.

The TFT 300 having a gate electrode 110, a source electrode 210 and a drain electrode 315 are formed on the second substrate 100. Also, an auxiliary capacitor Cst having the first auxiliary electrode 140, a gate insulating layer 170 and the second auxiliary electrode 313 are formed, e.g. when the TFT 300 is formed.

The organic layer 371 is formed over the second substrate 100 on which the TFT 300 and auxiliary capacitor Cst are formed. The organic layer 371 has a contact hole 800 so as to expose the second auxiliary electrode 313. Also, the organic layer 371 has an upper surface formed with concave and convex portions, thereby improving a reflectance of the reflective electrode 416 formed on the organic layer 371.

The reflective electrode 416 is formed on the organic layer 371 and electrically connected to the second auxiliary electrode 313 through the contact hole 800. Also, the reflective electrode 416 may be electrically connected to the drain electrode 315 because the second auxiliary electrode 313 is an extension of the drain electrode 315.

The first member 200 includes a black matrix layer 500 and a common electrode 240. A column spacer 430a is disposed between the first and second members 200 and 5000. A lower portion of the column spacer 430a is received in the contact hole 800, so that the column spacer 430a makes contact with the reflective electrode 416 disposed on the second auxiliary electrode 313.

Thus, the reflective type LCD apparatus 10000 may prevent an opening ratio from being lowered due to the column spacer 430a. Also, the reflective type LCD apparatus 10000 may prevent the first member 200 from being pushed down toward the alternative second member 5000 because the column spacer 430a is formed on the reflective electrode 416.

In addition, the black matrix 500 formed on the first member 200 is positioned to overlie the column spacer 430a. Thus, the column spacer 430a is not projected onto a screen of the reflective type LCD apparatus 10000, thereby improving a display quality of the reflective type LCD apparatus 10000.

Figure 10:
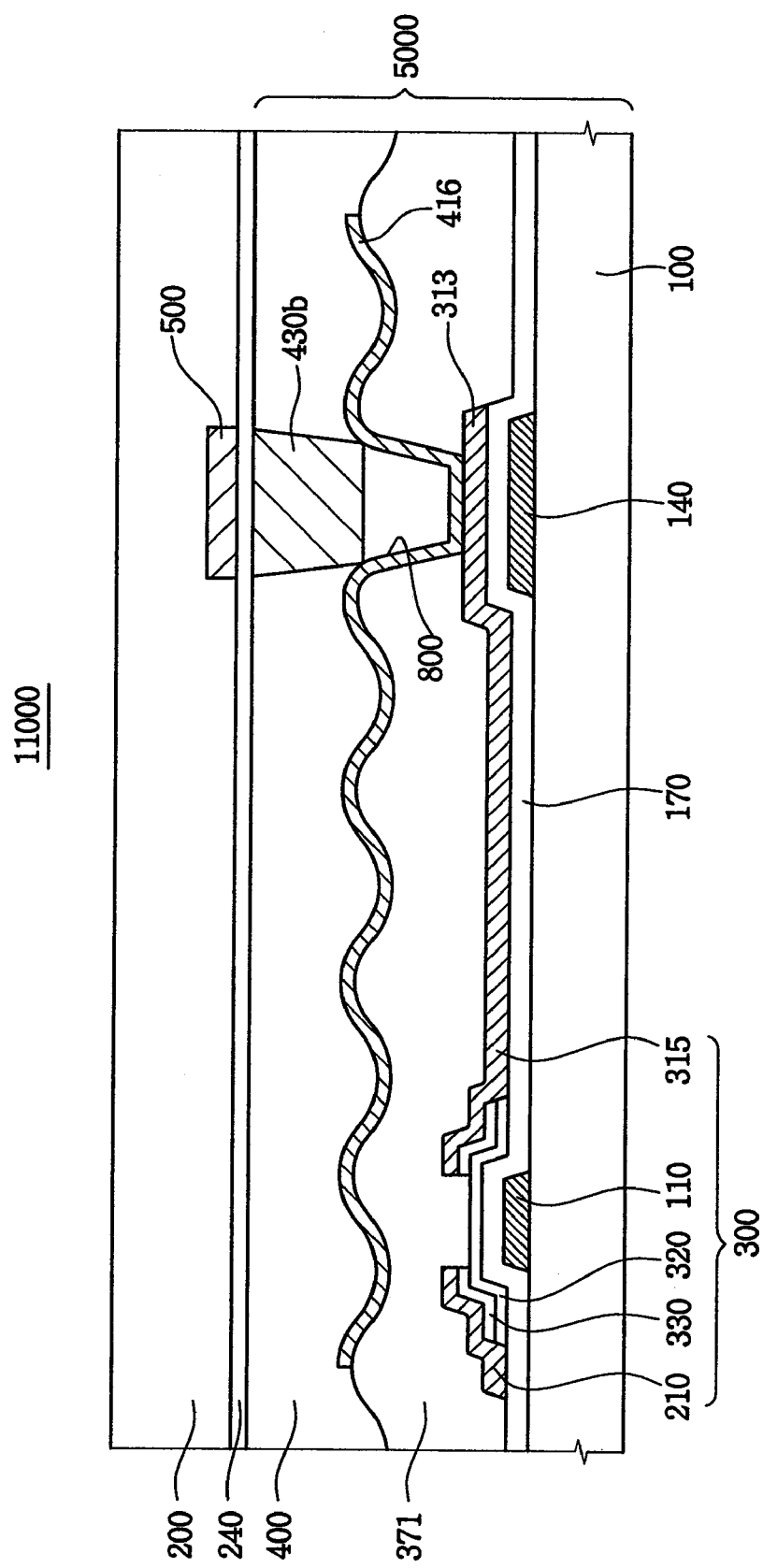
FIG. 10 is a cross-sectional view showing a reflective type LCD apparatus according to another exemplary embodiment of the present invention.

FIG. 10 is a cross-sectional view showing a reflective type LCD apparatus according to another exemplary embodiment of the present invention. In FIG. 10, the same reference numerals denote the same elements in FIG. 9, and thus the detailed descriptions of the same elements will be omitted.

Referring to FIG. 10, a reflective type LCD apparatus 11000 includes a first member 200, a alternative second member 5000, a liquid crystal layer 400 interposed between the first and second members 200 and 5000 and a column spacer 430b disposed between the first and second members 200 and 5000 so as to uniformly maintain a cell gap therebetween.

The alternative second member 5000 includes a gate electrode 110, a first auxiliary electrode 140, a gate insulating layer 170, a semiconductor layer 320, an ohmic contact layer 330, a source electrode 210, a drain electrode 310 operated as a second auxiliary electrode 313, an organic layer 371 through which a contact hole 800 is formed so as to expose the second auxiliary electrode 313 and a pixel electrode 416 formed on the second auxiliary electrode 313 exposed through the contact hole 800 and the organic layer 370.

The pixel electrode 416 is electrically connected to the second auxiliary electrode 313 through the contact hole 800 and also electrically connected to the drain electrode 315 because the second auxiliary electrode 313 is an extension of the drain electrode 315.

The column spacer 430b is formed by depositing an organic layer (not shown) on a common electrode 240 formed on the first member 200 and patterning the organic layer.

The column spacer 430b is formed on a non-effective display area where an auxiliary capacitor Cst having the first and second auxiliary electrodes 140 and 313 makes contact with the pixel electrode 416 disposed on the organic layer 371.

As described above, the column spacer 430b is formed on the non-effective display area to prevent any reduction of the opening ratio in the reflective type LCD apparatus 11000.

The first member 200 includes a black matrix layer 500 disposed on the non-effective display area overlying the column spacer 430b. The black matrix layer 500 prevents the column spacer 430b from being projected onto a screen of the reflective type LCD apparatus 11000, thereby improving a display quality of the reflective type LCD apparatus 11000.

Also, the reflective type LCD apparatus 11000 may prevent the first member 200 from being pushed down toward the alternative second member 5000 because the column spacer 430b is formed on the pixel electrode 416.

Figure 11:
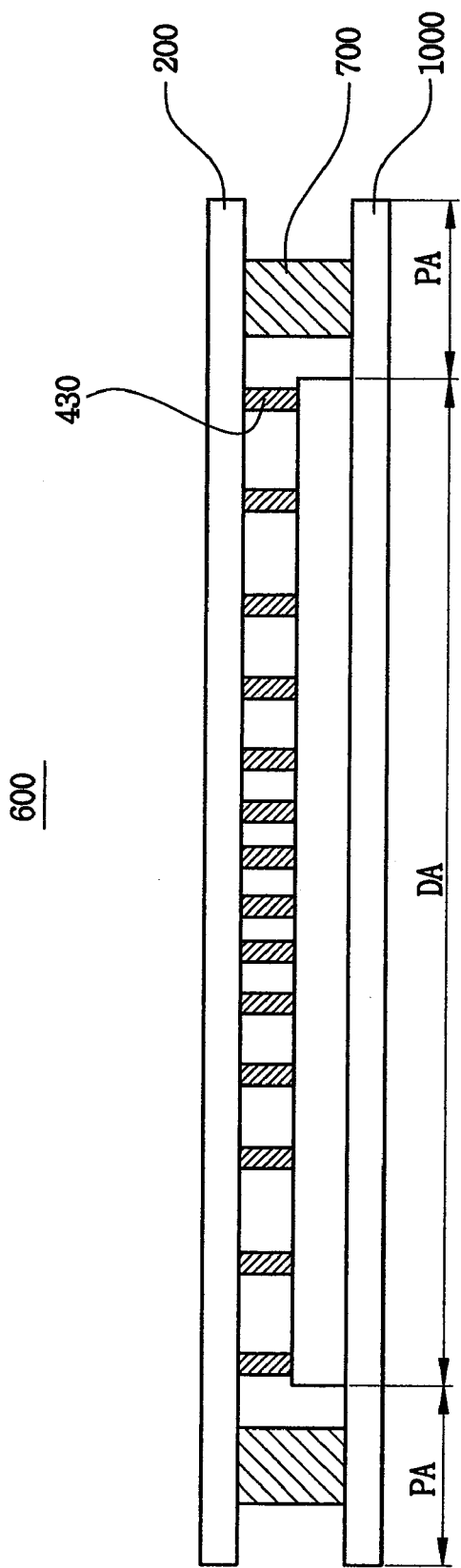
FIG. 11 is a cross-sectional view showing an LCD apparatus having a plurality of column spacers according to an exemplary embodiment.

FIG. 11 is a cross-sectional view showing an LCD apparatus having a plurality of column spacers according to an exemplary embodiment of the present invention.

Referring to FIG. 11, an LCD apparatus 600 includes a first member 200, a second member 1000 combined with the first member 200, a sealant 700 disposed between the upper and lower substrate 200 and 1000 to hold the first and second members 200 and 1000 together, and a plurality of column spacer 430 disposed between the first and second members 200 and 1000 to uniformly maintain a cell gap between the substrates.

The LCD apparatus 600 is divided into a display area DA where a plurality of pixels are formed and a peripheral area PA surrounding the display area DA.

The sealant 700 is formed between the first and second members 200 and 1000 in the peripheral area PA. The column spacers 430 are disposed between the first and second members 200 and 1000 in the display area DA. A plurality of layers other than the spacers, such as an insulating layer, an electrode layer or the like, are formed in the display area DA. The column spacers 430 are also formed on the layers. Since the plurality of layers are formed in the display area but not in the peripheral area, each of the column spacers 430 has a length smaller than a length of the sealant 700.

As shown in FIG. 11, the distance between the column spacers 430 is not constant. In the example shown, the distance between two immediately neighboring spacers 430 decreases as the center of the second member 1000 is approached. Thus, generally, the spacers 430 are positioned closer together farther away from the peripheral area PA. The reason for this arrangement is that the column spacers 430 disposed in an area of the display area DA near the peripheral area PA receive "help" from the sealant 700 in absorbing an impact applied to an outer portion of the display area DA. When the contribution from the sealant 700 is taken into account, fewer column spacers 430 are needed to absorb the same strength of force. Thus, the column spacers 430 near the peripheral area PA can be sparsely arranged. In contrast, the column spacers 430 near the center portion of the display area DA do not receive much "help" from the sealant 700, and have to absorb the impact by themselves. Thus, more column spacers 430 are needed to absorb the same strength of force near the center portion of the substrate, calling for a denser arrangement of the spacers 430.

FIGS. 12A to 12F illustrate a method of manufacturing an LCD apparatus according to an exemplary embodiment of the present invention.

Figure 12A:
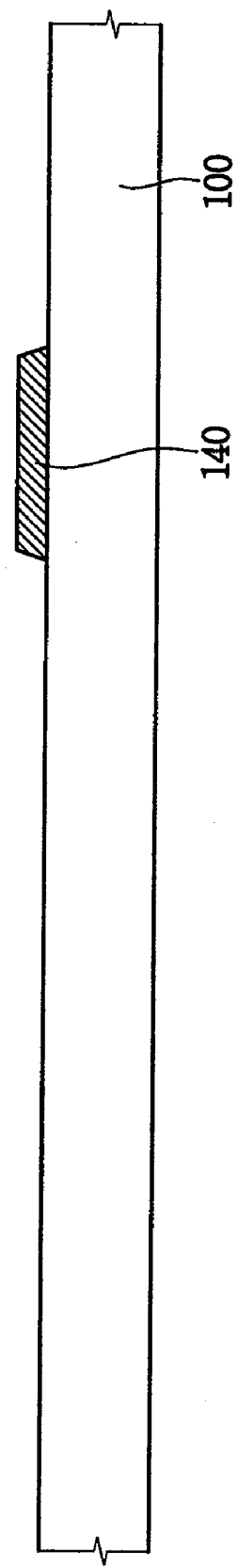

Referring to FIG. 12A, a metal layer, such as aluminum or aluminum alloy, is deposited on an second substrate 100 and patterned through a first mask process to form a first auxiliary electrode 140. The first auxiliary electrode 140 is formed separately from a gate line or a data line described below.

Figure 12B:
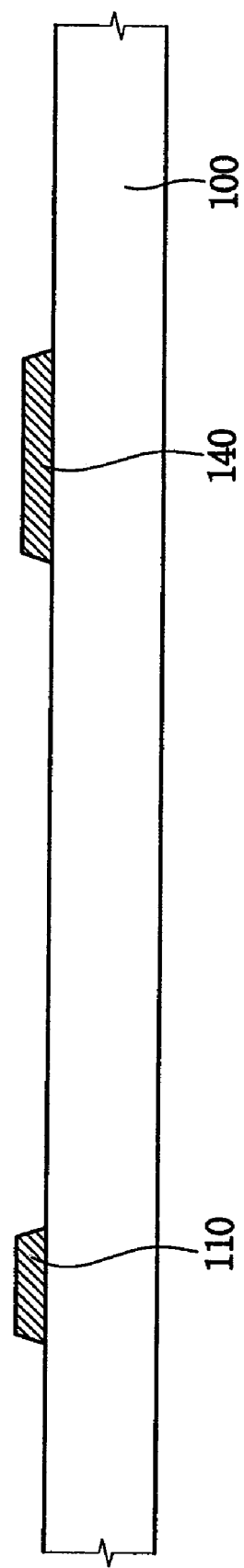

Referring to FIG. 12B, a metal layer containing chromium (Cr), molybdenum (Mo), tantalum (Ta) or antimony (Sb) is deposited on the second substrate 100 and patterned through a second mask process to form a gate electrode 110 and a gate line (not shown).

Figure 12C:
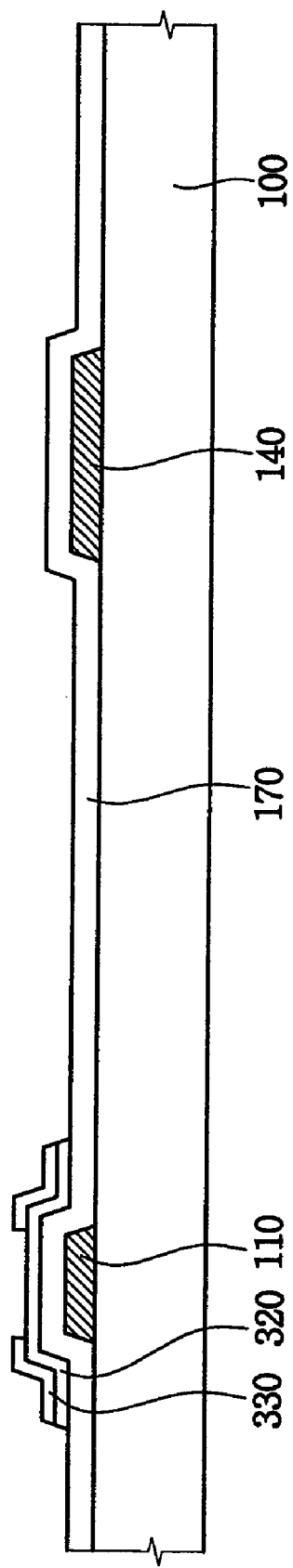

Referring to FIG. 12C, a gate insulating layer 170 containing an inorganic material is formed over the second substrate 100 on which the gate electrode 110 and first auxiliary electrode 140 are formed. Then, an intrinsic semiconductor, such as amorphous silicon, and an extrinsic semiconductor doped with impurities are successively deposited on the gate insulating layer 170. The extrinsic and intrinsic semiconductors are sequentially patterned through a third mask process to form an ohmic contact layer 330 and a semiconductor layer 320.

Referring to FIG. 12D, a metal layer containing chromium is formed over the second substrate 100 and patterned through a fourth mask process to form a source electrode 210, a drain electrode 315, a second auxiliary electrode 313 and a data line (not shown).

The source electrode 210 is overlapped with an end of the gate electrode 110 and the drain electrode 315 is overlapped with another end of the gate electrode 110, thereby forming a TFT 3000 on the second substrate 100.

The second auxiliary electrode 313 is an extension of the drain electrode 315 so as to be overlapped with the first auxiliary electrode 140. The first auxiliary electrode 140, second auxiliary electrode 313 and gate insulating layer formed between the first and second auxiliary electrodes 140 and 313 are operated as an auxiliary capacitor Cst.

Figure 12E:
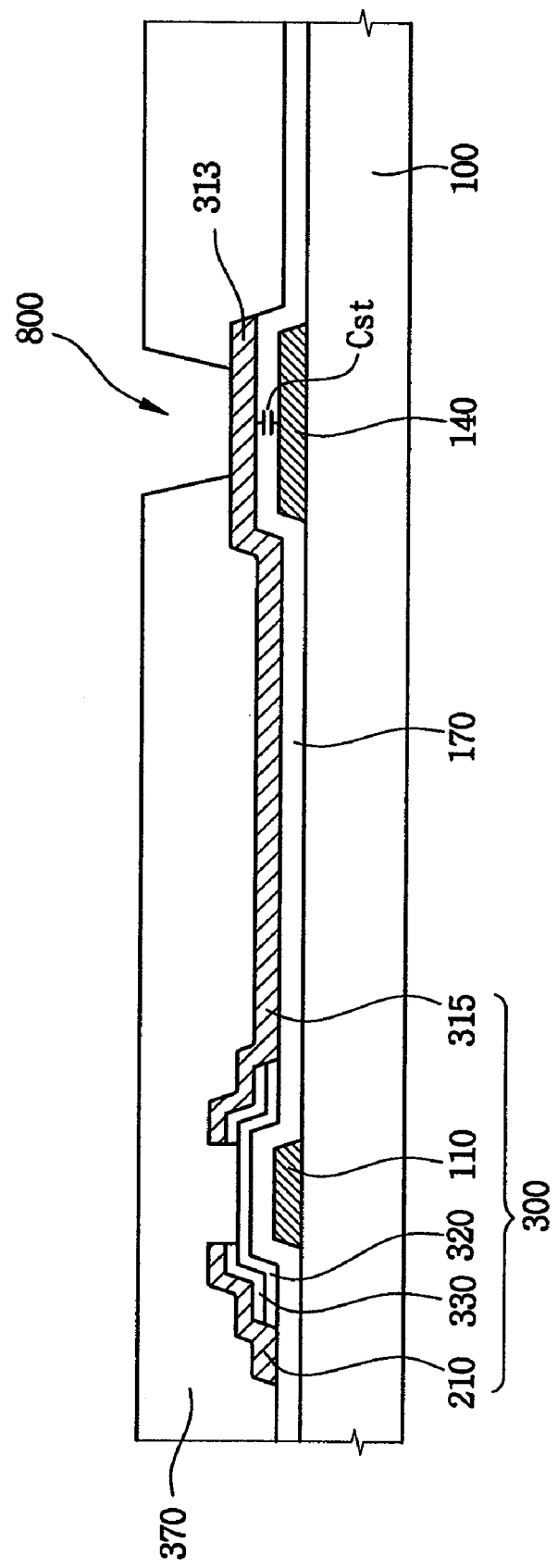

Referring to FIG. 12E, an organic layer 370 containing an organic insulating material, such as poly-benzocyclobutene, is formed over the second substrate 100 on which the TFT 300 and auxiliary capacitor Cst are formed. The organic layer 370 is patterned through a fifth mask process to form a contact hole 800, which partially exposes the second auxiliary electrode 313.

Referring to FIG. 12F, an ITO is deposited on the organic layer 370 and patterned through a sixth mask process to form a pixel electrode 410. The pixel electrode 410 is electrically connected to the second auxiliary electrode 313 through the contact hole 800.

As shown in FIG. 5, a column spacer 430a is formed overlying the auxiliary capacitor Cst. That is, a lower portion of the column spacer 430a is received in the contact hole 800 so that the column spacer 430a makes contact with the pixel electrode 410 disposed on the second auxiliary electrode 313.

The column spacer 430b may make contact with the pixel electrode 410 at an upper portion of the contact hole 800 so as to be supported by the pixel electrode 410 as shown in FIG. 6.

As described above, when the column spacers 430a and 430b are formed on a non-effective display area on which the auxiliary capacitor Cst is formed, the LCD apparatus shown in FIGS. 12A to 12F may prevent an opening ratio from being lowered due to the column spacers 430a and 430b.

Also, the LCD apparatus shown in FIG. 12A to 12F may prevent the first member 200 (see FIGS. 5 or 6) from being pushed down or bending toward the lower substrate 100 because the column spacers 430a and 430b are formed on the pixel electrode 410.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

What is claimed is:

1. A liquid crystal display apparatus comprising:
    a lower substrate comprising:
        a first insulating substrate;
        a gate line formed on the first insulating substrate;
        an auxiliary electrode line disposed between two adjacent gate lines and formed on a same layer as the gate line, wherein a portion of the auxiliary electrode line operates as a first auxiliary electrode of an auxiliary capacitor;
        a data line formed over the gate line;
        a second auxiliary electrode extending from a drain electrode, the second auxiliary electrode overlapping the first auxiliary electrode;
        an organic layer covering the drain electrode and the second auxiliary electrode, the organic layer having a contact hole for exposing a portion of the second auxiliary electrode, wherein the contact hole is disposed over the auxiliary electrode line and the second auxiliary electrode that overlap with each other; and
        a pixel electrode formed on organic layer, the pixel electrode being electrically connected to the drain electrode through the contact hole;
    an upper substrate coupled to the lower substrate, the upper substrate having a spacer to uniformly maintain a cell gap between the lower and upper substrates, wherein the spacer is disposed corresponding to the contact hole so that the spacer is disposed over the first auxiliary electrode and the second auxiliary electrode; and
    a liquid crystal interposed between the lower and upper substrates.

2. The liquid crystal display apparatus of claim 1, wherein the spacer is disposed in the contact hole.

3. The liquid crystal display apparatus of claim 1, wherein the spacer is disposed outside the contact hole.

4. The liquid crystal display apparatus of claim 3, wherein a lower surface of the spacer has greater size than the contact hole, so that no portion of the spacer protrudes into the contact hole.

5. The liquid crystal display apparatus of claim 3, wherein the upper substrate further comprises:
    a second insulating substrate;
    a common electrode disposed on the second insulating substrate; and
    a black matrix disposed between the second insulating substrate and the spacer.

6. The liquid crystal display apparatus of claim 3, wherein a planar portion of the common electrode is disposed between the spacer and the black matrix.

7. A method of manufacturing an liquid crystal display apparatus, comprising:
    preparing a lower substrate having an auxiliary capacitor, said preparing the lower substrate including:
        forming a gate line and an auxiliary electrode line between two adjacent gate lines on a same layer, the auxiliary electrode line operating as a first auxiliary electrode of the auxiliary capacitor;
        forming a data line, and a second auxiliary electrode of the auxiliary capacitor, the second auxiliary electrode extending from a drain electrode, wherein the second auxiliary electrode overlaps the first auxiliary electrode;
        forming an organic layer to cover the drain electrode and the second auxiliary electrode, the organic layer having a contact hole for exposing a portion of the second auxiliary electrode, wherein the contact hole is disposed over the first auxiliary electrode and the second auxiliary electrode; and forming a pixel electrode on organic layer, the pixel electrode being electrically connected to the drain electrode through the contact hole;

preparing an upper substrate to be coupled to the lower substrate, the upper substrate having a spacer to uniformly maintain a cell gap between the lower and upper substrates, wherein the spacer is disposed corresponding to the contact hole so that the spacer is disposed over the auxiliary electrode line and the second auxiliary electrode; and interposing a liquid crystal between the lower and upper substrates.

8. The method of claim 7, wherein the spacer is disposed in the contact hole.

9. The method of claim 7, wherein the spacer is disposed outside the contact hole.

10. The method of claim 9, wherein a lower surface of the spacer has greater size than the contact hole, so that no portion of the spacer protrudes into the contact hole.

11. The method of claim 7:
wherein said preparing the upper substrate comprises forming a black matrix on a second insulating substrate, and forming a common electrode on the second insulating substrate, and
wherein the black matrix is interposed between the second insulating substrate and the spacer, and a planar portion of the common electrode is disposed between the spacer and the black matrix.

* * * * *